Sept. 18, 1945.   A. M. DUDLEY   2,384,987
ELECTRIC VIBRATION GENERATOR
Filed July 20, 1943
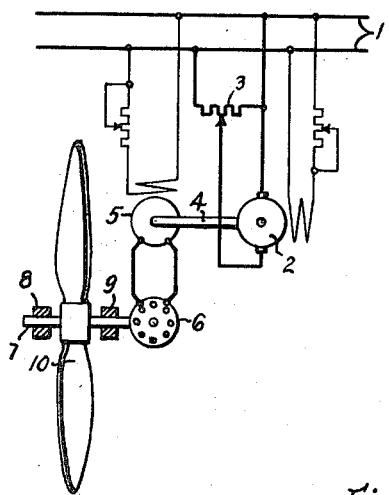
Fig.1.
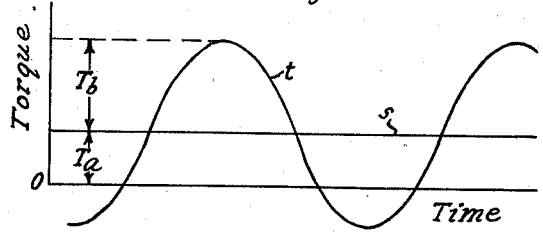
Fig.2.
Fig.3.
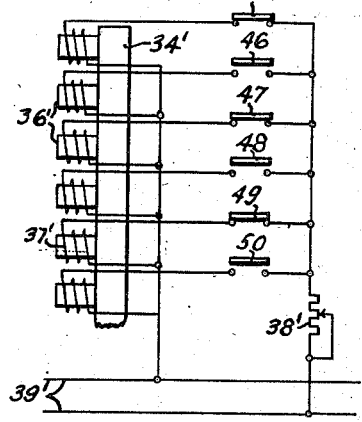
Fig.5.
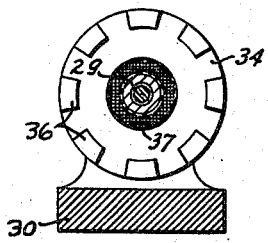
Fig.4.
WITNESSES:
Alice L. Howell
INVENTOR
Adolphus M. Dudley.
BY
Paul E. Friedemann
ATTORNEY Patented Sept. 18, 1945

2,384,987

UNITED STATES PATENT OFFICE 2,384,987

ELECTRIC VIBRATION GENERATOR

Adolphus M. Dudley, Oakmont, Pa., assignor to Westinghouse Electric Corporation, East Pittsburgh, Pa., a corporation of Pennsylvania Application July 20, 1943, Serial No. 495,469

6 Claims. (Cl. 73—67)

My invention relates to apparatus and machines for testing vibration properties of machine elements, and in particular to the vibration generator of such devices.

The strength and fatigue properties of machine elements which in normal operation are subjected to rotation and apt to be stressed by vibratory forces when so operating, can be tested by measuring one or several determinants of the mechanical strength, such as deformation, elongation, or internal heat consumption, of a specimen while imparting thereto a rotary motion similar to that at which the specimen is to perform its normal function. In the case of airplane propellers, for instance, the test can be performed by mounting the specimen on the drive shaft of a test stand and actuating the shaft by an internal combustion engine of operating characteristics similar to those of the aircraft engine to which the propeller is to be attached. This method, however, is far from satisfactory. The use of an aircraft engine as test motor is uneconomical due to the fact that the engine deteriorates relatively fast in this type of operation and is rather costly as regards replacement and continuous operation on a test stand. Furthermore, the amplitudes and frequencies of the vibrations thus produced are limited and difficult to vary in accordance with different desired test conditions.

It is an object of my invention to eliminate, for test purposes as above mentioned, the necessity of using aircraft engines, or generally a motor of a type determined by the intended use and normal function of the specimen, and to provide a vibration generator which simulates the rotary and vibratory stress of normal operating conditions while permitting a more satisfactory control or variation of the vibratory stress in accordance with different desired test conditions.

Another object of my invention, allied to the foregoing, is to produce a continuous revolution together with a vibration of controlled or measured magnitude with the aid of electrical drive means so as to take advantage of the economy, regulatability and simplicity of control of this type of power supply.

It is also an object of my invention to provide a vibration generator for testing purposes which affords superimposing on a continuous revolution of a specimen, an axial oscillation, or simultaneous axial and peripheral (torsional) oscillations of predetermined or controllable amplitude and frequency.

According to a still further object, the invention aims at providing a separate vibration generating device which can be added to any suitable rotary drive for superimposing a vibratory component on the rotation produced by the drive.

In order to achieve these objects, and in accordance with my invention, a test stand for vibration tests of propellers or other rotary machine elements is equipped with a revolvably supported drive shaft for carrying the specimen, and this shaft is provided with an electric drive which includes a rotating armature and a stator field so designed as to produce an oscillatory force between armature and stator during the continuous rotary motion of the shaft.

In one aspect of this invention, the just-mentioned vibration generator consists of a single-phase alternating-current motor, thus utilizing the characteristic of this type motor to reduce the motor torque to zero twice within each cycle of the alternating load current.

In another aspect, the invention provides an electric rotary drive of substantially uniform torque and a separate electromagnetic device of the type above mentioned for modifying the continuous rotation produced by the rotary drive.

A feature of my invention, in another one of its aspects, is to employ a rotating multipole armature and a multipole stator spaced axially from each other so as to produce alternating, i. e. vibratory forces in the axial direction of the revolving shaft and specimen, or in both the axial and peripheral directions.

According to a feature related to the immediately foregoing, the field poles of the device are energized through selective switching means in order to permit a selection of different groups of peripherally spaced poles for controlling the frequency of the generated vibrations independently of the speed of rotation of the specimen.

These and other objects and features of the invention will be understood from the following description of the diagrams shown in the drawing, in which:

Figure 1 represents schematically a device for testing propellers which contains a single-phase induction motor for producing a continuous rotation together with superimposed torsional vibrations of the propeller to be tested, Fig. 2 is a torque diagram for elucidating the operation of the device shown in Fig. 1, Fig. 3 represents the circuit diagram and essential mechanical equipment of another testing device for propellers in which a separate drive motor is employed in addition to an electric vibration generator, Fig. 4 is a sectional view on the line IV—IV of Fig. 3 showing the poles surface of a stator appertaining to the just-mentioned vibration generator of Fig. 3, while Fig. 5 represents the diagram of the energizing circuit of a modified form of a vibration generator applicable in test machines of the type shown in Fig. 3.

In Fig. 1, numeral 1 denotes a direct-current source. A variable speed motor 2 is connected to this source through a speed regulating potentiometer 3 or the like control apparatus. The shaft 4 of motor 2 drives an alternating-current generator 5 which is electrically connected to a single-phase induction motor 6. The motor acts on a drive shaft 7 revolvably supported by bearings 8 and 9 for carrying a propeller 10 which represents the specimen to be tested. The shaft 7 is practically rigid between the motor 6 and the propeller 10, so that the motion imparted to the shaft by the motor is transmitted to the propeller 10 without essential suppression of its vibratory component.

By varying the speed of motor 2 with the aid of control apparatus 3, the frequency of the alternator 5 is varied accordingly and together therewith the speed of rotation of motor 6. Consequently, the propeller 10 can be driven at variable speeds, corresponding for instance to the speed range of an aircraft engine.

The torque characteristic of a single-phase induction motor is apparent from the diagram in Fig. 2, the ordinate representing values of torque and the abscissa correlated values of time. The average torque of the motor is represented by the straight line $s$, and the instantaneous torque by curve $t$. The instantaneous torque $t$ may be considered as composed of a steady or average component $T_a$ and an alternating component $T_b$. The alternating component $T_b$ is always equal or greater than the steady component $T_a$. Accordingly, the motion imparted to shaft 7 can also be analyzed to consist of a steady component corresponding to $T_a$ and a superposed vibration corresponding to the portions of curve $t$ exceeding the torque magnitude of line $s$. This vibratory component has twice the frequency of the alternating current in motor 6 and acts in the peripheral direction of the propeller rotation.

The mechanical vibration thus superimposed on the continuous rotation is transmitted by the rigid shaft to the propeller in the ratio of the $WR^2$ value (moment of inertia; W represents the total weight of the rotating body and R its radius) of the motor to the $WR^2$ value of the propeller.

For instance, in the case of a 9 cylinder aircraft engine running at 1500 rotations per minute, the vibrations produced in the propeller would be $4\frac{1}{2} \times 1500 = 6750$ per minute or 112.5 per second. Torsional vibrations of this frequency can be simulated in a testing device according to Fig. 1 by supplying the alternating current motor 6 with current whose frequency is $56\frac{1}{4}$ cycles. By varying the frequency of the motor current above and below this value, the vibratory conditions existing during starting and overload periods of an aircraft power plant can be simulated on the test stand.

In the embodiment shown in Fig. 3, a constant speed motor 11 is fed from a suitable current source 12 and drives a shaft 13 on which are mounted the armature 14 of a direct current generator G and the armature 15 of an exciter E. The output circuit of the generator armature 14 is connected through a self-energizing generator field 16 with the armature 17 of a motor M, a control rheostat 18 being arranged in this series connection. The field winding 19 of the motor M is connected to the exciter armature 15 through a self-exciting field winding 20 of the exciter. The exciter, due to the fact that it is driven at constant speed, produces a constant direct current voltage effective in the motor field winding 19. Consequently, the speed of motor M depends only on the voltage supplied to the armature 17 from the generator G. Since this voltage is dependent on the adjustment of rheostat 18, the speed of armature 17 can be controlled within wide limits by regulating the rheostat. The speed of motor 11 remains constant for each adjustment.

The shaft 21 of motor M is journalled in bearings denoted by 22, 23 and 24 and carries a flywheel 25 and a pulley 26. A drive belt 27 connects pulley 26 with a pulley 28 mounted on the drive shaft 29 of the testing machine.

The testing machine has a base structure 30 provided with a standard 31 which contains bearing for journalling the shaft 29 so as to allow for axial displacements of the shaft. The propeller or other specimen to be tested is arranged at 32.

The vibration generator for superimposing on the rotary motion of the specimen a vibratory component consists of a rotatable armature 33 and a stator 34. The armature 33 is firmly mounted on the drive shaft 29 and carries a multiplicity of magnetic pole pieces 35 which extend from the main body of the armature towards the stator 34 substantially in parallel to the axis of rotation and are equally spaced from one another in the peripheral direction of the armature. The stator 34 is provided with an equal number of equally spaced field poles 36. The pole surfaces proper of the pole pieces 35 lie in a common radial plane relative to the axis of rotation. The pole surfaces of field poles 36 are similarly arranged so that an air gap exists between the respective pole pieces and field poles. The stator 34 is provided with an energizing winding 37 which is connected through a control rheostat 38 to a current source 39.

When the field poles 36 are energized they exert a magnetic force on the pole pieces 35 of the armature 33. This force has an alternating direction when the armature 33 is in rotation, and hence imparts through the armature a vibratory force on shaft 29 and the specimen 32. The magnetic force acting between each field pole 36 and a pole piece 35 passing through the magnetic field of the pole acts in the peripheral direction of the rotation as well as in its axial direction. Consequently, the vibration imparted to the specimen has a torsional and an axial component. The axial component tends to displace the shaft 29. In order to adjust the effect of this axial displacement, a spring 40 is arranged between the standard 31 and the armature 33 and a second spring 41 between the shaft 29 and an abutment 42 slidably mounted in a standard 43. The abutment 42 can be displaced by means of a nut 44 in order to vary the force of spring 41 relative to that of spring 40.

A testing arrangement according to Fig. 3, has the advantage that the operation of the vibration generator is independent of that of the rotary drive. In order to permit a control of the vibration frequency independent of the speed of rotation of the specimen, the energizing circuit of the stator 34 can be fed by alternating current of suitable frequency or may include a periodically operating interrupter of selective frequency. Another way of controlling the vibration frequency independently of the speed of rotation is exemplified by Fig. 5.

According to Fig. 5, the field poles 36' of a stator 34', otherwise arranged and designed as described in connection wtih Fig. 3, are provided with individual field coils 37'. These coils are connected in parallel to a current source 39' through a control rheostat 38' which permits adjusting the amplitude or intensity of the vibrations. The parallel connection extends over a group of switch contacts 45 through 50. These contacts permit selecting different groups of the field coils 37' for energization. If all of the contacts 45 through 50 are closed, all field coils are energized so that the vibrator operates at maximum frequency. If, for instance, each second contactor is opened as illustrated in Fig. 5, each second field pole is operative while the intermediate field poles are not magnetized. Consequently, the vibrator operates now at half the maxmium frequency. Similarly, if each third contact is closed with the two intermediate contacts in open position only one third of the maximum frequency is obtained. It will be understood that by providing the vibrator with a large number of poles, the range of selective frequencies can be increased correspondingly. In practice, however, only a limited number of vibration frequencies is as a rule necessary.

It will be understood that either the rotor or the stator may be provided with a smaller number of poles than the respective other member. For instance, with a multipole stator as shown in Fig. 5 a rotor may be employed with only one pole piece or preferably with a fractional number of pole pieces, as compared with that of the stator, in accordance with the ratio of the available minimum and maximum frequencies. A variation in frequency can also be obtained by providing a number of exchangeable armatures or stators with a different number of poles so that the proper selection can be made by choosing the corresponding vibrator element.

Furthermore, the vibration generator shown in Fig. 3 may be replaced by a single-phase alternating current motor arranged and controlled similarly to motor 6 in Fig. 1; or conversely, a constant torque drive such as shown in Fig. 3 may be added to a system similar to that of Fig. 1. In both cases, the single-phase motor serves only as a vibration generator while the rotary driving torque is substantially supplied by a separate drive motor.

I claim as my invention:

1. A device for testing rotary machine elements, comprising a drive shaft having a portion for carrying the element to be tested, an electric motor connected to said shaft for imparting a continuous revolution to said shaft and said element, and means for imposing during said revolution a vibration of given frequency on said shaft, said means containing a magnetic armature firmly mounted on said shaft, a multiple stator arranged in magnetically cooperative relation to said armature, and electric energizing means for causing said stator and armature to exert forces of alternating direction on said shaft during the revolution of the latter.

2. A device for testing rotary machine elements, comprising a drive shaft having a portion for carrying the element to be tested, an electric motor connected to said shaft for imparting a continuous revolution to said shaft and said element, and means for imposing during said revolution a vibration of given frequency on said element, said means containing a magnetic rotor firmly mounted on said shaft, a stator having a plurality of field poles, field windings for energizing said poles, electric energizing means for causing said stator and rotor to exert forces of alternating direction on said shaft during the revolution of the latter, and selective switch means connected between said windings and said energizing means for varying the number and mutual spacing of the field poles to be energized in order to control the frequency of said vibration.

3. A vibrator for testing rotary machine elements, comprising a drive shaft having a portion for carrying the element to be tested and being journalled so as to be capable of axial displacement, an electric motor connected to said shaft for imparting a continuous revolution to said shaft and element, and means connected to said shaft for superimposing on said revolution an axial vibration, said means including a magnetic armature mounted on said shaft, a stator arranged in magnetic relation to said armature, and electric energizing means for causing said stator to produce alternating axial force on said armature in order to effect vibratory axial displacement of said shaft and element during said revolution.

4. A vibrator for testing rotary machine elements, comprising a drive shaft having a portion for carrying the element to be tested and being journalled so as to be capable of axial displacement, an electric motor connected to said shaft for imparting a continuous revolution to said shaft and element, and means connected to said shaft for superimposing on said revolution an axial vibration, said means including a magnetic multipole armature mounted on said shaft, a stator having a plurality of field poles arranged in magnetic relation to said armature and spaced axially from said armature to exert thereon forces in the axial direction, field windings on said stator for exciting said field poles, electric energizing means connected with said windings for causing said stator to exert alternating axial forces on said armature during said revolution, and selective switch means connected between said windings and said energizing means for varying the number and mutual spacing of the field poles to be energized in order to thereby control the frequency of said vibration.

5. A vibrator for testing rotary machine elements, comprising a drive shaft journalled so as to be capable of axial displacement and having a portion for carrying the element to be tested, a stationary abutment and spring means disposed between said abutment and said shaft to bias said displacement, an electric motor connected to said shaft for imparting a continuous revolution to said element, and electric means for superimposing on said revolution simultaneous peripheral and axial vibrations, said means including a magnetic multipole armature mounted on said shaft and a multipole stator arranged relative to said armature and spaced therefrom axially so as to exert alternating peripheral and axial forces on said armature during said revolution.

6. A vibrator for testing propellers, comprising a drive shaft for carrying the propeller to be tested, a supporting structure for journalling said shaft so as to permit axial displacements of the latter, drive means for imparting continuous revolution to said shaft, an apparatus arranged for superimposing on said revolution vibrations in peripheral and axial directions and including a magnetic armature mounted on said shaft and having a plurality of pole pieces spaced peripherally from one another and having respective pole surfaces extending substantially in a common radial plane relative to said shaft, a stator having a plurality of peripherally spaced field poles with pole surfaces located substantially in a common radial plane and axially spaced from said pole surfaces of said pole pieces, field windings inductively associated with said field poles, and selective circuit means connected with said windings for energizing a selective group of said field poles.

ADOLPHUS M. DUDLEY.